United States Patent
Pruss et al.

(10) Patent No.: US 11,113,424 B2
(45) Date of Patent: Sep. 7, 2021

(54) DEVICE, SYSTEM AND METHOD FOR INSTALLING ENCRYPTED DATA

(71) Applicant: MOTOROLA SOLUTIONS, INC., Chicago, IL (US)

(72) Inventors: Brian W. Pruss, Streamwood, IL (US); Ellis A. Pinder, Davie, FL (US); Thomas S. Messerges, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 89 days.

(21) Appl. No.: 16/405,454

(22) Filed: May 7, 2019

(65) Prior Publication Data
US 2020/0356701 A1    Nov. 12, 2020

(51) Int. Cl.
*H04L 9/08* (2006.01)
*G06F 21/78* (2013.01)
(Continued)

(52) U.S. Cl.
CPC ............ *G06F 21/78* (2013.01); *H04L 9/0822* (2013.01); *H04L 9/0894* (2013.01);
(Continued)

(58) Field of Classification Search
CPC .......... G06F 21/78; G06F 21/57; G06F 21/76; G06F 21/52; G06F 21/72; G06F 21/575;
(Continued)

(56) References Cited

U.S. PATENT DOCUMENTS

| 5,666,411 A | 9/1997 | McCarty |
| 6,233,685 B1 | 5/2001 | Smith et al. |

(Continued)

FOREIGN PATENT DOCUMENTS

KR    101067615 B1    9/2011

OTHER PUBLICATIONS

Wikipedia, "Elliptic-Curve Diffie—Hellman.", Wikimedia Foundation, 2013, URL: https://en.wikipedia.org/wiki/Elliptic-curve_Diffie-Hellman.

*Primary Examiner* — Kristine L Kincaid
*Assistant Examiner* — Shaqueal D Wade
(74) *Attorney, Agent, or Firm* — Perry + Currier, Inc.

(57) ABSTRACT

A device, system and method for installing encrypted data are provided. A device includes a processor comprising: immutable memory storing preconfigured trust anchor data; and a module storing preconfigured non-exportable data. The processor is configured to: receive an encrypted common protection key, encrypted using a manufacturing protection key, and an encrypted distribution private key, encrypted using a common protection key; obtain the manufacturing protection key using the preconfigured trust anchor data and the preconfigured non-exportable data; decrypt the encrypted common protection key using the manufacturing protection key to obtain the common protection key; decrypt the encrypted distribution private key using the common protection key to obtain a distribution private key; receive an encrypted data package including image-at-rest data encrypted with an image-at-rest key, the encrypted data package including encryption data for obtaining the image-at-rest key using the distribution private key; and install the encrypted data package at the memory.

19 Claims, 10 Drawing Sheets

(51) Int. Cl.
*H04L 29/06* (2006.01)
*G06F 21/57* (2013.01)

(52) U.S. Cl.
CPC ........ *H04L 63/0442* (2013.01); *H04L 63/062* (2013.01); *G06F 21/57* (2013.01)

(58) Field of Classification Search
CPC .. G06F 21/62; G06F 21/6209; G06F 21/6281; G06F 21/60; G06F 21/606; H04L 9/08; H04L 9/0894; H04L 9/0819; H04L 9/0822; H04L 9/0825; H04L 9/06; H04L 9/30; H04L 9/14; H04L 9/32; H04L 9/3247; H04L 63/04; H04L 63/0442; H04L 63/08; H04L 63/082; H04L 63/0435; H04L 63/045; H04L 63/0861; H04L 63/0869; H04L 63/088; H04L 63/062
See application file for complete search history.

(56) References Cited

U.S. PATENT DOCUMENTS

| | | | |
|---|---|---|---|
| 6,385,727 | B1 | 5/2002 | Cassagnol et al. |
| 7,270,193 | B2 | 9/2007 | Hashimoto et al. |
| 9,100,174 | B2* | 8/2015 | Hartley ............... H04L 9/0866 |
| 9,430,658 | B2* | 8/2016 | Covey ............... H04L 63/0823 |
| 9,479,328 | B1* | 10/2016 | Wilburn ............... H04L 9/0822 |
| 2008/0229115 | A1* | 9/2008 | Wollnik ............... H04L 9/0825 |
| | | | 713/190 |
| 2014/0164779 | A1* | 6/2014 | Hartley ............... H04L 9/0866 |
| | | | 713/176 |
| 2014/0317417 | A1 | 10/2014 | Ashkenazi |
| 2015/0121070 | A1* | 4/2015 | Lau ............... H04L 63/0823 |
| | | | 713/164 |
| 2017/0111354 | A1 | 4/2017 | Buendgen et al. |
| 2019/0044708 | A1* | 2/2019 | Dewan ............... G06F 21/85 |
| 2019/0087577 | A1 | 3/2019 | Doliwa |
| 2019/0372780 | A1 | 12/2019 | Messerges et al. |
| 2020/0252207 | A1* | 8/2020 | Hanel ............... G06F 21/572 |

* cited by examiner

DATA BUILD DEVICE 105 / ENCRYPTION OF IMAGE

DEVICE, SYSTEM AND METHOD FOR INSTALLING ENCRYPTED DATA

BACKGROUND OF THE INVENTION

Products, such as mobile devices, are often manufactured in third party facilities. Data and/or applications of the products are hence provisioned at the third party facilities which may allow access of the data by a third party that operates the facility, which can be a security risk.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
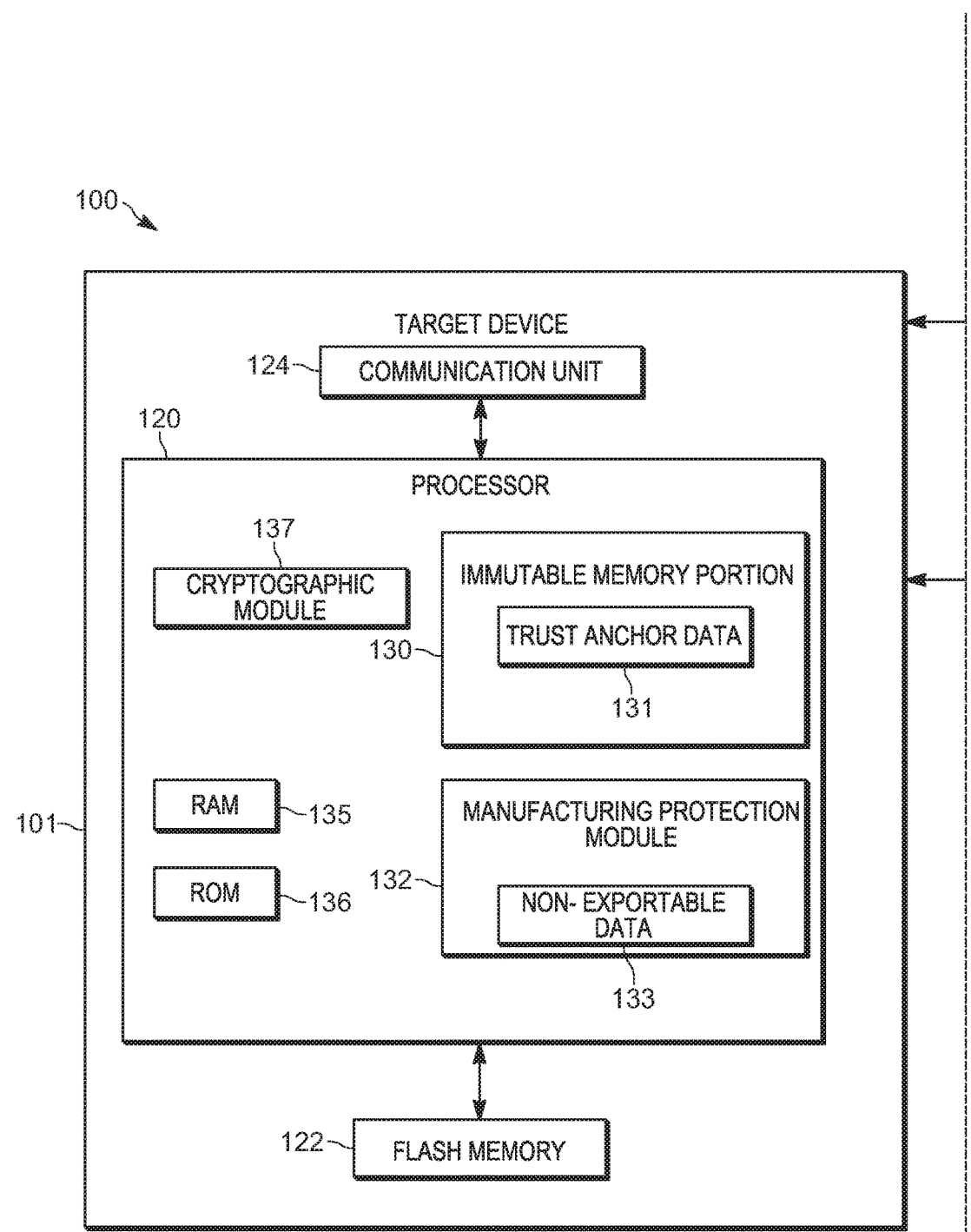
FIG. 1A, FIG. 1B and FIG. 1C depict a system for installing encrypted data, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Products, such as mobile devices, are often manufactured in third party facilities. Data and/or applications of the products, such as firmware and the like, are hence provisioned at the third party facilities which may allow access of the data to a third party that operates the facility, which can be a security risk. While the data, and the like, may be encrypted, the third parties generally should not have access to decryption keys (or encryption keys). Similarly, third party developers that may be used to develop the data, and the like, may not be trusted to control the encryption keys, and/or have access to the decryption keys. Hence, the present specification provides a device, system and method for installing encrypted data, for example at the device, without a third party manufacturer having access to decryption keys or a third party developer controlling the encryption keys and/or the decryption keys.

An aspect of the specification provides a device comprising: a communication unit; a memory; a processor including: an immutable memory portion storing preconfigured trust anchor data; and a module storing preconfigured non-exportable data for obtaining a manufacturing protection key using the preconfigured trust anchor data; the processor configured to: receive, via the communication unit: an encrypted common protection key, encrypted using the manufacturing protection key; and an encrypted distribution private key, encrypted using a common protection key corresponding to the encrypted common protection key; obtain the manufacturing protection key using the preconfigured trust anchor data and the preconfigured non-exportable data; decrypt the encrypted common protection key using the manufacturing protection key to obtain the common protection key; decrypt the encrypted distribution private key using the common protection key to obtain a distribution private key; receive, via the communication unit, an encrypted data package including image-at-rest data encrypted with an image-at-rest key, the encrypted data package including encryption data for obtaining the image-at-rest key using the distribution private key; and install the encrypted data package at the memory.

Another aspect of the specification provides a method comprising: receiving, at a processor of a device, an encrypted common protection key, encrypted using a manufacturing protection key; and an encrypted distribution private key, encrypted using a common protection key corresponding to the encrypted common protection key; obtaining, at the processor, the manufacturing protection key using preconfigured trust anchor data, stored at an immutable memory portion of the processor, and preconfigured non-exportable data, stored at a module of the processor; decrypting, at the processor, the encrypted common protection key using the manufacturing protection key to obtain the common protection key; decrypting, at the processor, the encrypted distribution private key using the common protection key to obtain a distribution private key; receiving, at the processor, an encrypted data package including image-at-rest data encrypted with an image-at-rest key, the encrypted data package including encryption data for obtaining the image-at-rest key using the distribution private key; and installing, using the processor, the encrypted data package at a memory of the device.

Another aspect of the specification provides a method to securely update software in a portable device, comprising: receiving, at a processor of the portable device, an encrypted software package comprising: encryption data for obtaining an image-at-rest key using a distribution private key; and software encrypted with the image-at-rest key; decrypting, at the processor, an encrypted distribution private key using a common protection key to obtain a distribution private key; obtaining, at the processor, the image-at-rest key from the encryption data and the distribution private key; decrypting, at the processor, the encrypted software package with the image-at-rest key to obtain the software; and executing, at the processor, the software.

Figure 1B:
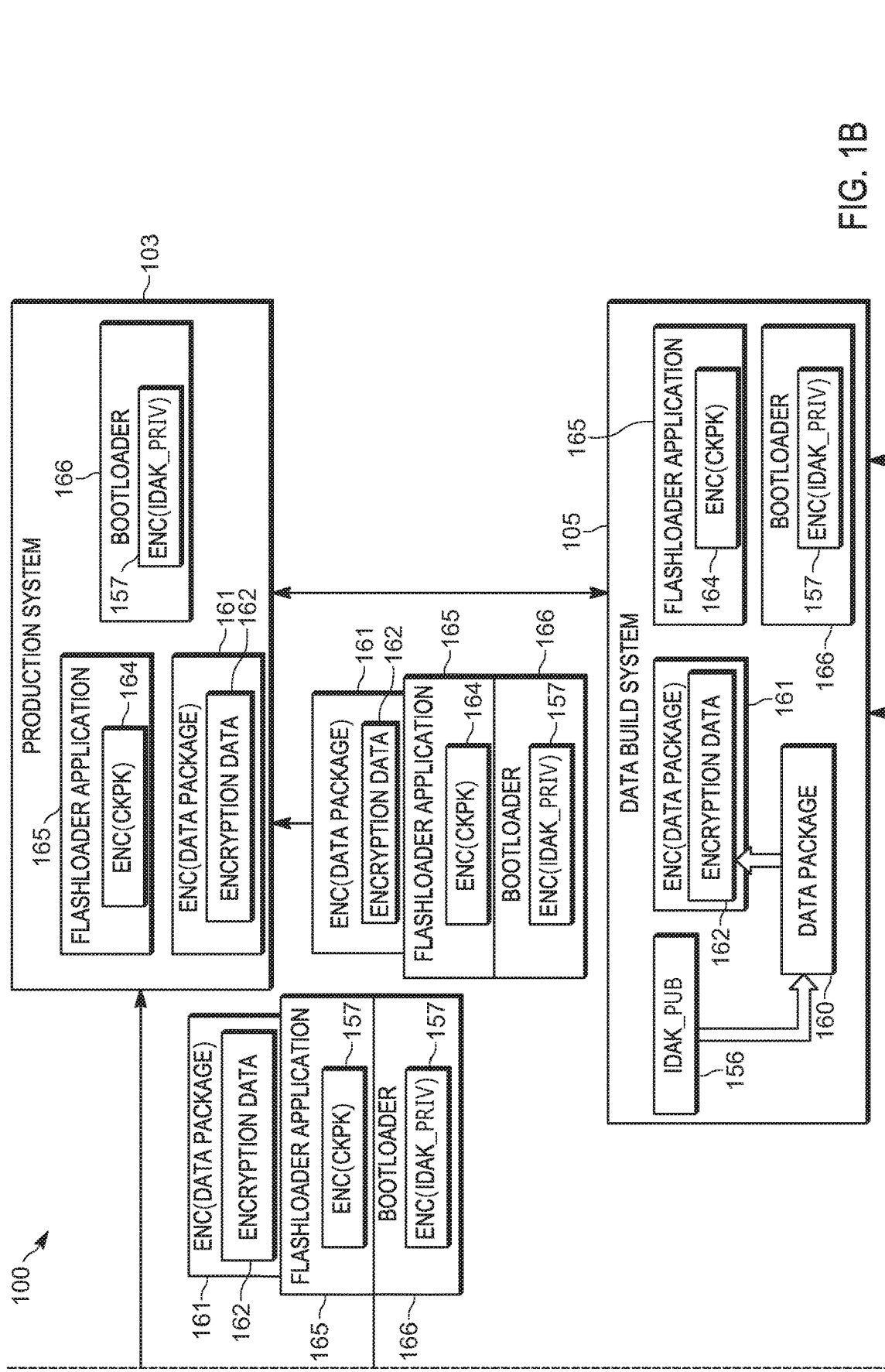
Figure 1C:
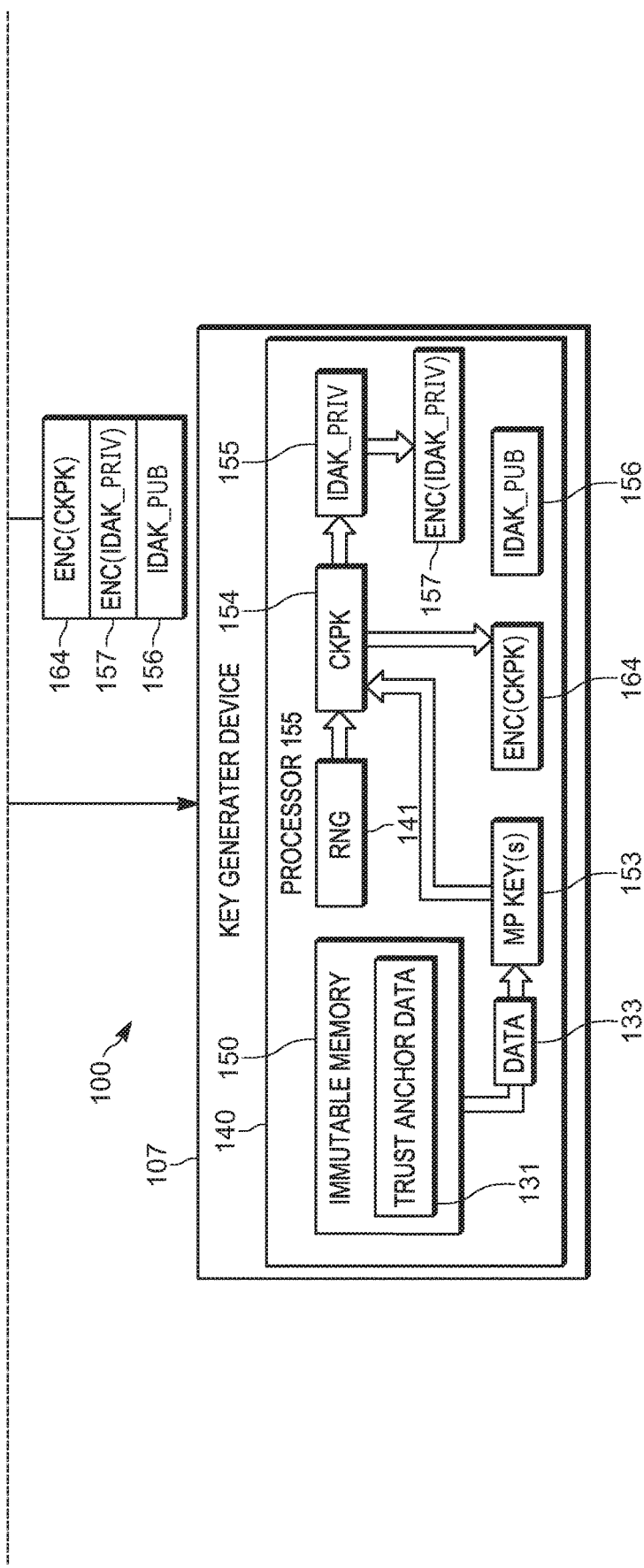

Attention is directed to FIG. 1A, FIG. 1B and FIG. 1C, which depict an example system 100 for installing encrypted data. The system 100 comprises a target device 101 onto which encrypted data is to be installed, a production system 103, a data build system 105, and a key generator device 107. Communication links between components of the system 100 are depicted in FIG. 1A, FIG. 1B and FIG. 1C, and throughout the present specification, as double-ended arrows between respective components. While not depicted, the components of the system 100 may communicate using one or more communication networks. Furthermore, the various communication links may be temporary and/or be established on demand.

The target device 101 (interchangeably referred to hereafter as the device 101) may comprise a mobile device and/or a portable device, such as radio device, and the like, which is being assembled (e.g., at an assembly plant) by an entity associated with the production system 103. However, the target device 101 may comprise any suitable device assembled by an entity associated with the production system 103.

In particular, the device 101 comprises: a secure processor 120 (interchangeably referred to hereafter as the processor 120), a memory 122 and a communication unit 124. In one example, as depicted, the memory 122 comprises a flash memory used for program and data storage.

The processor 120 may comprise a processing unit which includes an immutable memory portion 130 storing preconfigured trust anchor data 131; and a module 132 (e.g., a "Manufacturing Protection Module") storing preconfigured non-exportable data 133 for obtaining a manufacturing protection key using the preconfigured trust anchor data 131, as described in more detail below.

As depicted, the processor 120 further comprises a Random-Access Memory (RAM) 135 and a code Read Only Memory (ROM) 136 (e.g., the RAM 135 and the ROM 136 are internal to the processor 120; however, the device 101 may include RAM external to processor 120).

As further depicted, the processor 120 may comprise a cryptographic module 137 (comprising hardware components and software components) configured to implement cryptographic functionality of the processor 120. For example, the cryptographic module 137 may include applications and dedicated processing resources configured to encrypt and/or decrypt data according to any suitable algorithms and/or standards including, but not limited to, Elliptic Curve Integrated Encryption Scheme ("ECIES") algorithms, Advanced Encryption Standard (AES) algorithms, key derivation functions, and the like.

While not depicted, the components of the processor 120 are interconnected via a common data and address bus, and further interconnected with other components of the device 101 via the common data and address bus.

For example, while not depicted, the device 101 may further comprise one or more of at least one input device and a display screen and the like, as well as any other suitable components for implementing functionality of the device 101.

In general, data at the immutable memory portion 130 is stored as fused bits and/or as data that, once written, may not be erased and/or changed.

In general, the trust anchor data 131 and the non-exportable data 133, may be configured at the processor 120 prior to assembly of the device 101, for example at one or more factories manufacturing the processor 120 and/or configuring the processor 120 for a given product line (e.g., such as a product line that includes the device 101).

For example, the non-exportable data 133 may be configured at the processor 120 when the processor 120 is physically manufactured at a first factory (e.g., by a processor manufacturing company); all processors of the same make and model will include the same non-exportable data 133. After manufacture, the processor 120 may be shipped to a second factory of an entity associated with the product line that includes the device 101 (e.g., a company that designs and sells the device 101); at such a second factory, the processor 120 is configured with the trust anchor data 131 at the immutable memory portion 130. The trust anchor data 131 is hence common to all the devices in the product line that includes the device 101. After the trust anchor data 131 is configured at the immutable memory portion 130, the processor 120 may be shipped to a third factory (e.g., an assembly plant of a third party manufacturer) where the device 101 is assembled and the processor 120 is configured, as described below. However, such a manufacturing process flow is one example only and the processor 120 may be configured with the trust anchor data 131 and the non-exportable data 133 in any suitable manner.

The trust anchor data 131 may comprise an integral association to a unique public key, such as a super-root key (SRK) and/or an SRK hash, and the like. For example, trust anchor data 131 may comprise a hash of a public key complementary to a private key used to sign applications, code and/or software that is to be executed by the processor 120 and/or device 101. Hence, the trust anchor data 131 may be used to verify such applications, code and/or software prior to such applications, code and/or software being executed by the processor 120 and/or device 101.

The non-exportable data 133 comprises data stored at the module 132 that is used to generate and/or derive a manufacturing key, as described in more detail below. For example, the non-exportable data 133 may comprise random numbers, one or more SRK hashes, and the like, stored at the module 132 at the time of manufacture of the processor 120. The non-exportable data 133 is generally stored in format and/or a distributed format at the module 132 such that an external device accessing the device 101 cannot access the data 133; hence the non-exportable data 133 may also be referred to as a common non-exportable "secret" (e.g., a secret common to the processors of the same make and model as the processor 120.

Hence, each processor 120 that is to be incorporated into a device of the product line that includes the device 101 includes the same trust anchor data 131 and the same non-exportable data 133.

The communication unit 124 may be configured for communicating with the production system 103, as well as for communicating with other devices and/or radio device when the device 101 is shipped (e.g., to a customer). Hence, the communication unit 124 may include one or more wired and/or wireless input/output (I/O) interfaces that are configurable to communicate with other devices similar to the device 101, as well as the production system 103. In particular, the communication unit 124 may be configured to communicate with the production system 103 in a wired manner, and further configured to communicate with other devices similar to the device 101 (and/or other radios) in a wireless manner. However, the communication unit 124 may alternatively be configured to communicate with the production system 103 in a wireless manner.

For example, the communication unit 124 may include one or more transceivers and/or wireless transceivers adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers of the communication unit 124 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 124 may further include one or more wireline transceivers (e.g., for communication with the production system 103), such as an Ethernet transceiver, a USB (Universal Serial Bus) transceiver, or similar transceiver configurable to communicate via a twisted pair wire, a coaxial cable, a fiber-optic link, or a similar physical connection to a wireline network. The communication unit 124 may also comprise a combined modulator/demodulator (not depicted) coupled to such transceivers.

The processor 120 may include ports (e.g., hardware ports) for coupling to other hardware components.

The processor 120 includes one or more logic circuits, one or more processors, one or more microprocessors, one or more ASICs (application-specific integrated circuits) and one or more FPGAs (field-programmable gate arrays), and/or another electronic device.

The memory 122 is a non-transitory machine readable medium that stores machine readable instructions to implement one or more programs or applications, for example as received from the production system 103, described in more detail below. Example machine readable media include a non-volatile storage unit (e.g., Erasable Electronic Programmable Read Only Memory ("EEPROM"), Flash Memory) and/or a volatile storage unit (e.g., random-access memory ("RAM")). As described herein, however, the memory 122 is interchangeably referred to as a flash memory 122.

While details of the systems 103, 105 are not depicted, each of the systems 103, 105 may include at least one or more devices that have components similar to the device 101, including, but not limited to, processors, memories, communication units, and the like, adapted, however, for the respective functionality of the systems 103, 105. Hence, while the system 103, 105 are referred to as "systems" herein, it is understood that the systems 103, 105 include hardware components.

In particular, the production system 103 may comprise at least computing device for provisioning the device 101 with data and/or applications and the like, in an encrypted format. The data and/or applications may be received at the production system 103 in the encrypted format from the data build system 105.

In general, certain cryptographic keys for the system 100 are generated by the key generator device 107, as described hereafter (though other cryptographic keys may be generated at the data build system 105 as also described hereafter). The cryptographic keys generated by the key generator device 107 may be communicated and/or transferred to other components of the system 100, and specifically the data build system 105, via one or more distribution channels, which may include communication links, physical transport of the cryptographic keys (e.g., as stored on memory devices) to facilities where the other components are located, and the like. However, in present examples, the one or more distribution channels are described with respect to communication links between the components of the system 100.

The key generator device 107 is next described in more detail. In particular the key generator device 107 may comprise a device for generating cryptographic keys and/or to perform a key ceremony for generating cryptographic keys.

The key generator device 107 generally includes a secure processor 140 similar to the processor 120, the secure processor 140 also storing the trust anchor data 131 in a respective immutable memory portion 150. Hence, the secure processor 140 is generally a same make and/or model and/or the processor 120, and it is understood that each of the processor 120, 140 have been configured with the same trust anchor data 131 (e.g., at the second factory of an entity associated with the product line that includes the device 101). The secure processor 140 is interchangeably referred to hereafter as the processor 140.

Being the same make and model as the processor 120, it is understood that, while not depicted, the processor 140 also includes a module similar to the module 132 and hence the processor 140 also stores the non-exportable data 133. Similarly, while not depicted, the processor 140 also generally includes a cryptographic module similar to the cryptographic module 137; for example, as depicted, the processor 140 includes a random number generator (RNG) 141 which may be a component of the cryptographic module of the processor 140.

In particular, the secure processor 140 generates at least one manufacturing protection key 153 from a combination of the trust anchor data 131 and the non-exportable data 133 using any suitable algorithm and/or key derivation function. The at least one manufacturing protection key 153 may be symmetric (e.g., one key) or asymmetric (e.g., a pair of complementary private and public keys). While present examples are described herein with respect to the at least one manufacturing protection key 153 being symmetric, the present examples may be adapted for use with complementary asymmetric manufacturing keys, for example Elliptic Curve Cryptography (ECC) keys to be used with ECIES algorithms. Hereafter the at least one manufacturing protection key 153 will be interchangeably referred to as the manufacturing protection key 153.

As the manufacturing protection key 153 is generated from a combination of the trust anchor data 131 and the non-exportable data 133, which is also stored at the processor 120, the processor 120 may also obtain the manufacturing protection key 153 from the trust anchor data 131 and the non-exportable data 133, as described below with respect to FIG. 5A.

The secure processor 140 further generates a common protection key 154 (labelled "CKPK" in FIG. 1A, FIG. 1B and FIG. 1C, or Common Key Protection Key) for example using the random number generator 141 and the like (e.g., the common protection key 154 may comprise a random number, and the like) and/or any suitable key derivation function. Indeed, the common protection key 154 may generally comprise a symmetric key that is used to encrypt/decrypt subordinate keys in the system 100 as described hereafter.

For example, the secure processor 140 also generates an asymmetric pair of distribution keys including: a private distribution key 155 (labelled in FIG. 1A, FIG. 1B and FIG. 1C as "IDAK_PRIV" or "Image Distribution Asymmetric Key Private") and a complementary public distribution key 156 (labelled in FIG. 1A, FIG. 1B and FIG. 1C as "IDAK_PUB" or "Image Distribution Asymmetric Key_Public"). For example, the private distribution key 155 and the public distribution key 156 may be generated using any suitable private/public key generator algorithm including, but not limited to, a private/public ECC key generator algorithm, a private/public RSA (Rivest-Shamir-Adleman) key generator algorithm, and the like.

In general, the secure processor 140 further encrypts the common protection key 154 using the manufacturing protection key 153 using any suitable encryption algorithm to produce an encrypted common protection key 164 for distribution to the data build system 105 (and later the production system 103). However, ECIES algorithms may be used to encrypt the common protection key 154, for example when the manufacturing protection keys 153 are asymmetric.

The secure processor 140 further encrypts the private distribution key 155 using any suitable algorithm using the common protection key 154 to produce an encrypted private distribution key 157 for distribution to data build system 105 (and later the production system 103). The public distribution key 156 may be distributed to the data build system 105 in an unencrypted format. Hence, the common protection key 154 and the private distribution key 155 are distributed in encrypted formats, while the public distribution key 156 is distributed in an unencrypted format. The unencrypted common protection key 154 and private distribution key 155 are generally kept internal to secure processor 140 and never exported out, without first being encrypted.

The encrypted private distribution key 157, the encrypted common protection key 164, and the public distribution key 156 may be generated in a one-time key ceremony at the key generating device 107, for example, as supervised by an entity associated with the device 101 (e.g., the entity which designs and sells the device 101). The encrypted private distribution key 157, the encrypted common protection key 164, and the (unencrypted) public distribution key 156 may then be distributed, as depicted, to the data build system 105 in any suitable manner via the one or more distribution channels.

The data build system 105 is next described in more detail. In particular the data build system 105 may comprise one or more computing devices operated by a third-party developer that develops data and/or applications and/or software and/or code, such as firmware and the like. Such data and/or applications and/or software and/or code is generally to be provisioned and/or installed at the device 101, for example by the production system 103 in an initial provisioning of the device 101. However, the data build system 105 may further generate updates to the firmware, and the like, which may be provisioned and/or installed at the device 101, over-the-air in a later provisioning of the device 101, for example when the device 101 has been sold and/or is in the field.

As depicted, for example, the data build system 105 stores a data package 160 that generally includes image-at-rest data, which may include data and/or applications to be provisioned at the device 101. Such image-at-rest data of the data package 160 may include, but is not limited to, a software image, a firmware image and/or device firmware, a distribution software manager application, and/or any other suitable data and/or applications. The data package 160 may be generated by the data build system 105 and/or the data package 160 may be generated by one or more other computing devices and provided to the data build system 105 for encryption and distribution to the production system 103.

Hence, the data build system 105 is generally configured to encrypt the data package 160 using an image-at-rest key generated at least using the public distribution key 156, for example using ECIES algorithms, to produce an encrypted data package 161 which, as depicted, is transmitted to the production system 103. As depicted, encryption data 162 for obtaining the image-at-rest key using the private distribution key 155 may be incorporated into the encrypted data package 161. Indeed, a specific implementation of generating the encrypted data package 161 using ECIES and the public distribution key 156 is described below with respect to FIG. 3A and FIG. 3B, and a specific format of the encrypted data package 161 (e.g., as incorporated into a distribution package) that includes the encryption data 162 for obtaining the image-at-rest key using the private distribution key 155 is described below with respect to FIG. 4.

As depicted, the data build system 105 further stores and/or generates a flashloader application 165 and incorporates the encrypted common protection key 164 therein. As described below, the flashloader application 165 (with the encrypted common protection key 164) is provided to the device 101 to install the encrypted data package 161. In particular, the flashloader application 165 may be processed and/or executed by the device 101 and/or processor 120 to cause the device 101 and/or processor 120 to: obtain the manufacturing protection key 153 and the common protection key 154; and store the common protection key 154 as a wrapped (e.g., encrypted) common protection key (e.g., see FIG. 5A) in the immutable memory portion 130 (and/or the flash memory 122).

As depicted, the data build system 105 further stores and/or generates a bootloader application 166 and incorporates the encrypted private distribution key 157 therein. As described below, the bootloader application 166 (with the encrypted common protection key 164) is provided to the device 101 to assist with installing the encrypted data package 161. The bootloader application 166 generally comprises any suitable bootloader, and the like, configured to load an operating system and/or firmware, and the like, at the device 101, for example at a boot-time and/or a run-time of the device 101.

Each of the flashloader application 165 and the bootloader application 166 may be signed using the private key complementary to the public key corresponding to the trust anchor data 131 (e.g., a hashed SRK).

Regardless, as the data build system 105 is only provided with the encrypted private distribution key 157, the encrypted common protection key 164, and the public distribution key 156, the data build system 105 does not control the keys of the system 100, nor can the data build system 105 decrypt the encrypted data package 161.

Furthermore, as depicted, the data build system 105 provides and/or transmits the encrypted data package 161 (with the encryption data 162), the flashloader application 165 (with the encrypted common protection key 164), and the bootloader application 166 (with the encrypted common protection key 164), to the production system 103 to assist the production system 103 with programming and/or provisioning the device 101.

The production system 103 is next described in more detail. In particular, the production system 103 is configured to program and/or provision the device 101 during its manufacture, such programming and/or provisioning including, but not limited to, the installation of the encrypted data package 161, the encrypted private distribution key 157, and the encrypted common protection key 164 at the device 101, as described in more detail below. Indeed, the production system 103 may alternatively be referred to as a factory production system and may be operated by a third party manufacturer contracted to assemble the device 101, for example by the entity which designs and sells the device 101.

In particular, the production system 103 may comprise an image and/or data loading device, and the like, which may receive the encrypted data package 161, the flashloader application 165 (with the encrypted common protection key 164), and the bootloader application 166 (with the encrypted private distribution key 157) from the data build system 105 for installation at the device 101.

As the production system 103 is not provisioned with any of the keys of the system 100 in an unencrypted format, such as the private distribution key 155, the production system 103 does not have access to the data package 160 (e.g., the production system 103 cannot decrypt the encrypted data package 161), nor any of the cryptographic keys of the system 100. In particular, as the production system 103 is not provisioned with the manufacturing protection key 153, nor the trust anchor data 131 or the data 133, neither does the production system 103 have access to the common protection key 154 (e.g., the production system 103 cannot decrypt the encrypted common protection key 164).

In particular, as depicted, the production system 103 is transmitting the encrypted data package 161 (with the encryption data 162), the flashloader application 165 (with the encrypted common protection key 164), and the bootloader application 166 (with the encrypted private distribution key 157), to the device 101 to program and/or provision the device 101 as next described.

Figure 2:
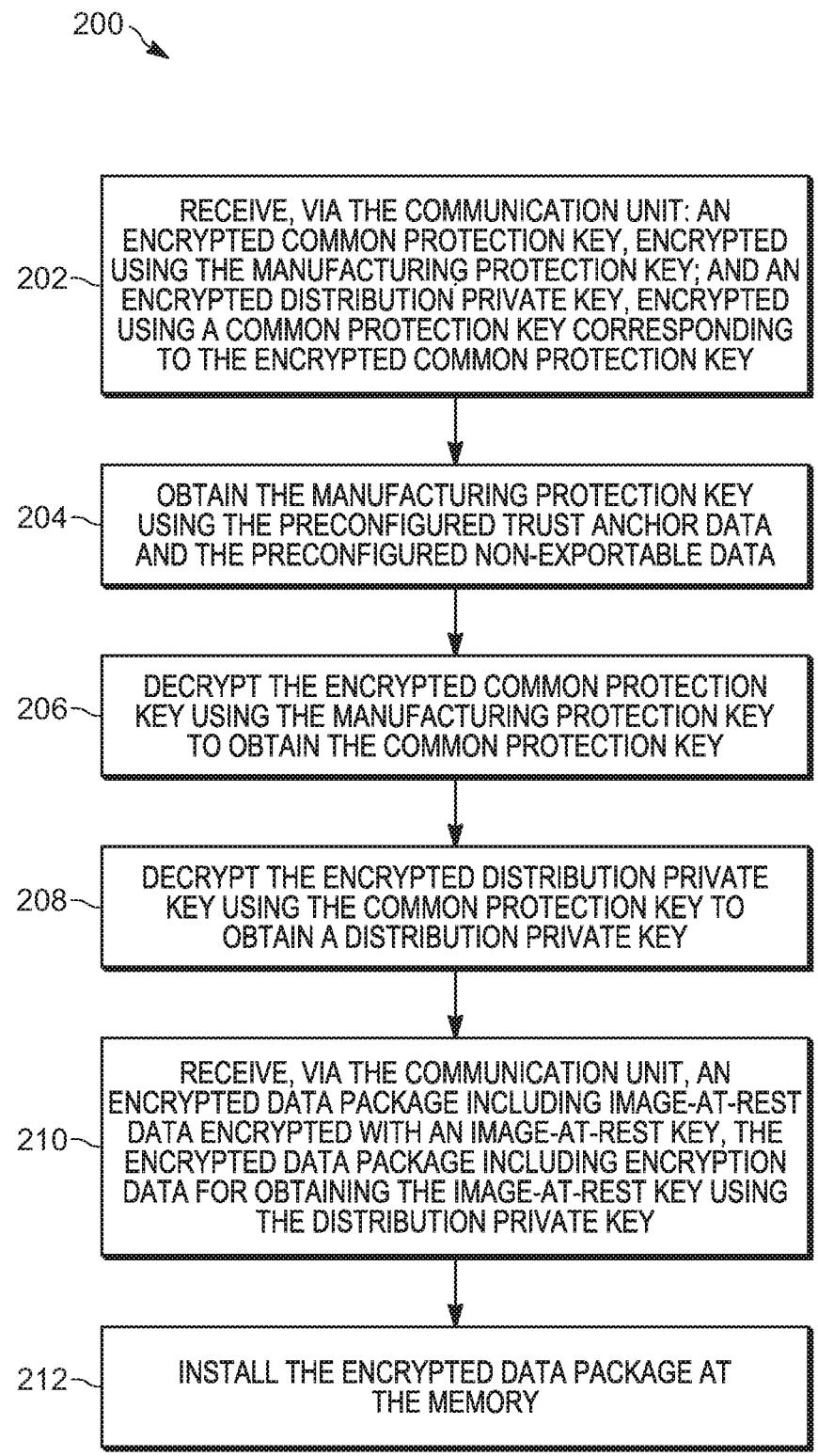
FIG. 2 depict a flowchart of a method for installing encrypted data, in accordance with some examples.

Attention is now directed to FIG. 2 which depicts a flowchart representative of a method 200 for installing encrypted data, including, but not limited to, the encrypted data package 161. The operations of the method 200 of FIG. 2 correspond to machine readable instructions that are executed by the device 101, and specifically the processor 120 of the device 101. In the illustrated example, the instructions represented by the blocks of FIG. 2 may be at least partially implemented by the cryptographic module 137 and/or the flashloader application 165 and may be at least partially implemented upon receipt of the flashloader application 165. The method 200 of FIG. 2 is one way in which the processor 120 and/or the device 101 and/or the system 100 may be configured. Furthermore, the following discussion of the method 200 of FIG. 2 will lead to a further understanding of the system 100, and its various components.

The method 200 of FIG. 2 need not be performed in the exact sequence as shown and likewise various blocks may be performed in parallel rather than in sequence. Accordingly, the elements of method 200 are referred to herein as "blocks" rather than "steps." The method 200 of FIG. 2 may be implemented on variations of the system 100 of FIG. 1A, FIG. 1B and FIG. 1C, as well.

At a block 202, the processor 120 and/or the device 101 receives, via the communication unit 124 (e.g., in a wired and/or wireless manner): the encrypted common protection key 164, encrypted using the manufacturing protection key 153; and the encrypted private distribution key 157, encrypted using the common protection key 154 corresponding to the encrypted common protection key 164. As described above, the encrypted private distribution key 157 stored at the memory 122 is encrypted using the common protection key 154 corresponding to the encrypted common protection key 164. The encrypted common protection key 164 may be received from the production system 103, for example with the flashloader application 165, and the encrypted private distribution key 157 may be received from the production system 103, for example with the bootloader application 166.

Furthermore, the block 204 may include verifying that the flashloader application 165 and/or the bootloader application 166 are properly signed, for example using the cryptographic module 137 and the trust anchor data 131. Indeed, in some examples, the device 101 and/or the processor 120 may be "closed" (e.g., when the trust anchor data 131 is installed) such that the device 101 and/or the processor 120 is prevented from executing unsigned applications and/or software and/or code.

In some examples, the encrypted common protection key 164 and the flashloader application 165 may be first received from the production system 103; and the flashloader application 165 may be stored at the RAM 135 and executed by the processor 120 (e.g., after verification). Execution of the flashloader application 165 may cause the bootloader application 166 to be received from the production system 103 (e.g., in a push and/or pull operation), and the bootloader application 166, with the encrypted private distribution key 157, may be stored at the flash memory 122.

At a block 204, the processor 120 and/or the device 101 obtains the manufacturing protection key 153 using the preconfigured trust anchor data 131 and the preconfigured non-exportable data 133. For example, the block 204 may be implemented via the cryptographic module 137 to generate and/or derive the manufacturing protection key 153 using the preconfigured trust anchor data 131 and the preconfigured non-exportable data 133 (described in more detail with respect to FIG. 5A). The process used to generate and/or derive the manufacturing protection key 153 may be similar to how the manufacturing protection key 153 is generated and/or derived at the key generator device 107 (e.g. the cryptographic module 137 includes similar cryptographic algorithms as the key generator device 107).

At a block 206, the processor 120 and/or the device 101 decrypts the encrypted common protection key 164 using the manufacturing protection key 153 to obtain the common protection key 154, for example using a decryption algorithm complementary to the encryption algorithm used to encrypt the common protection key 154 at the key generator device 107. For example, the block 206 may be implemented via the cryptographic module 137. In some examples, the processor 120 and/or the device 101 stores the common protection key 154 at the immutable memory portion 130 as a wrapped (e.g., encrypted) common protection key (e.g., see FIG. 5A), and the common protection key 154 is otherwise deleted, such that the common protection key 154 is never stored at the device 101 other than in a wrapped and/or encrypted format. For example, in a wrapped format, the common protection key 154 is encrypted with a key and/or data unique to the device 101 and/or the processor 120, including, but not limited to, a unique processor identifier, and the like.

Indeed, in some examples, the common protection key 154 is stored as a wrapped common protection key at the immutable memory portion 130 as fused bits, such that the preconfigured trust anchor data 131 and the wrapped common protection key are stored in the immutable memory portion 130 as fused bits. However, in other examples, the common protection key 154 may be stored as a wrapped common protection key at the flash memory 122.

At a block 208, the processor 120 and/or the device 101 decrypts the encrypted private distribution key 157 using the common protection key 154 to obtain the private distribution key 155, for example using a decryption algorithm complementary to the encryption algorithm used to encrypt the private distribution key 155 at the key generator device 107. In particular, the processor 120 and/or the device 101 may decrypt the encrypted private distribution key 157 using the common protection key 154 obtained from the wrapped common protection key; hence, in these examples, the wrapped common protection key is retrieved from the immutable memory portion 130, and decrypted to obtain the common protection key 154, which is used to decrypt the encrypted private distribution key 157 to obtain the private distribution key 155. However, the common protection key 154 is not stored, and/or the common protection key 154 is deleted after use. Furthermore, the common protection key 154 remains within the secure processor 120 when unencrypted, and in some examples the decrypted common protection key 154, and the decrypted private distribution key 155 exist only within a secure portion of the processor 120, such as within the cryptographic module 137, which may prevent the export of the keys 154, 155 in an unencrypted format. In general, the wrapped common protection key persists at the device 101 (e.g., at the immutable memory portion 130).

In some examples, the secure processor 120 is configured to securely unwrap wrapped keys and use unwrapped keys within a secure portion of the processor 120, such as within the cryptographic module 137; hence, such unwrapped keys cannot generally be read and/or exported out of such a secure portion. For example, such a secure portion may comprise processing resources within the secure processor 120 that are not accessible to devices external to the processor 120 and/or the device 101.

At a block 210, the processor 120 and/or the device 101 receives, via the communication unit 124, the encrypted data package 161 including the image-at-rest data encrypted with an image-at-rest key (e.g., see FIG. 3A and FIG. 3B), the encrypted data package 161 including the encryption data 162 (e.g., again see FIG. 3A and FIG. 3B) for obtaining the image-at-rest key using the private distribution key 155 (e.g., obtained at the block 208).

At a block 212, the processor 120 and/or the device 101 installs the encrypted data package 161 at the memory 122 (e.g., a flash memory).

In general, the block 202, the block 204 and the block 206 may only be implemented one time, for example when device 101 is manufactured, and the encrypted data package 161 is received from the production system 103. In these examples, the encrypted data package 161 may be received from the production system 103, for example, at the block 202 (e.g., with the flashloader application 165 (and the encrypted common protection key 164) and/or the bootloader application 166 (and the encrypted private distribution key 157), and/or the encrypted data package 161 may be received at another block of the method 200. Hence, in these examples, the block 210 may be combined with the block 202, and/or the block 210 may occur prior to the block 202, and/or the block 210 may be implemented at any suitable point in the method 200 separately and/or in conjunction with any of the block 202, the block 204, the block 206 and the block 208.

However, after the device 101 is shipped and/or deployed into the field, a device management system may be used to update the device 101, for example wirelessly and/or over-the-air. In these examples the device 101 may implement the blocks 208, 210 and 212 of the method 200 to receive and install another encrypted data package to update the device 101. In these examples, as a wrapped version of the common protection key 154 has been installed and/or stored at the device (e.g., at the immutable memory portion 130), and as the encrypted private distribution key 157 has also been installed and/or stored at the device 101 (e.g., as stored at the bootloader application 166 at the flash memory 122), the device 101 and/or the processor 120 need not execute the blocks 202, 204, 206.

As described below (e.g., with respect to FIG. 3A and FIG. 3B) the encrypted data package 161 included the encryption data 162 for obtaining the image-at-rest key using the private distribution key 155 such that the private distribution key 155 may be used to derive the image-at-rest key. Indeed, in some examples, the method 200 may further include the processor 120 and/or the device 101 obtaining the image-at-rest key using the encryption data 162 and the private distribution key 155 (e.g., obtained at the block 208); and storing, at the flash memory 122 and/or as fused bits at the immutable memory portion 130, the image-at-rest key as a wrapped image-at-rest key, similar to the wrapped common protection key. In a particular example, the encrypted data package 161 may be stored in the memory 122 with the wrapped image-at-rest key replacing the encryption data 162. Regardless, the image-at-rest key is not stored in an unencrypted format (e.g., see FIG. 3A and FIG. 3B).

Installation of the encrypted data package 161 at the memory 122 may occur in any suitable manner.

In some examples, the encrypted data package 161 may be stored at the memory 122 as received (e.g., encrypted, but with the wrapped image-at-rest key replacing the encryption data 162), and/or unencrypted using the wrapped image-at-rest key (e.g., processed to obtain the image-at-rest key) at a boot-time and/or a run-time. The image-at-rest data is then obtained from the encrypted data package 161 and processed and/or executed. The image-at-rest data is deleted when the device 101 is shut off, for example, such that the image-at-rest data is stored in an encrypted format at the encrypted data package 161.

Hence, in these examples, the processor 120 and/or the device 101 is further configured to: at one or more of a boot-time and a run-time: decrypt the image-at-rest data using the image-at-rest key obtained from the wrapped image-at-rest key; and process and/or execute the image-at-rest data.

However, in other examples, the processor 120 and/or the device 101 is further configured to install the encrypted data package 161 at the memory 122 by: decrypting the image-at-rest data using the image-at-rest key obtained from the wrapped image-at-rest key; and installing the image-at-rest data at the memory 122. Hence, in these examples, the image-at-rest data is stored at the memory 122 and processed and/or executed, for example at a boot-time and/or a run-time.

As described above, when the encrypted common protection key 164 is received, via the communication unit 124, in the flashloader application 165, the flashloader application 165 may be processed by the processor 120 to cause the processor 120 to at least: obtain the manufacturing protection key 153 and the common protection key 154; and store the common protection key 154 as a wrapped common protection key in the immutable memory portion 130. Hence, the flashloader application 165 may cause the processor 120 to implement at least the block 204 and the block 206.

Figure 3A:
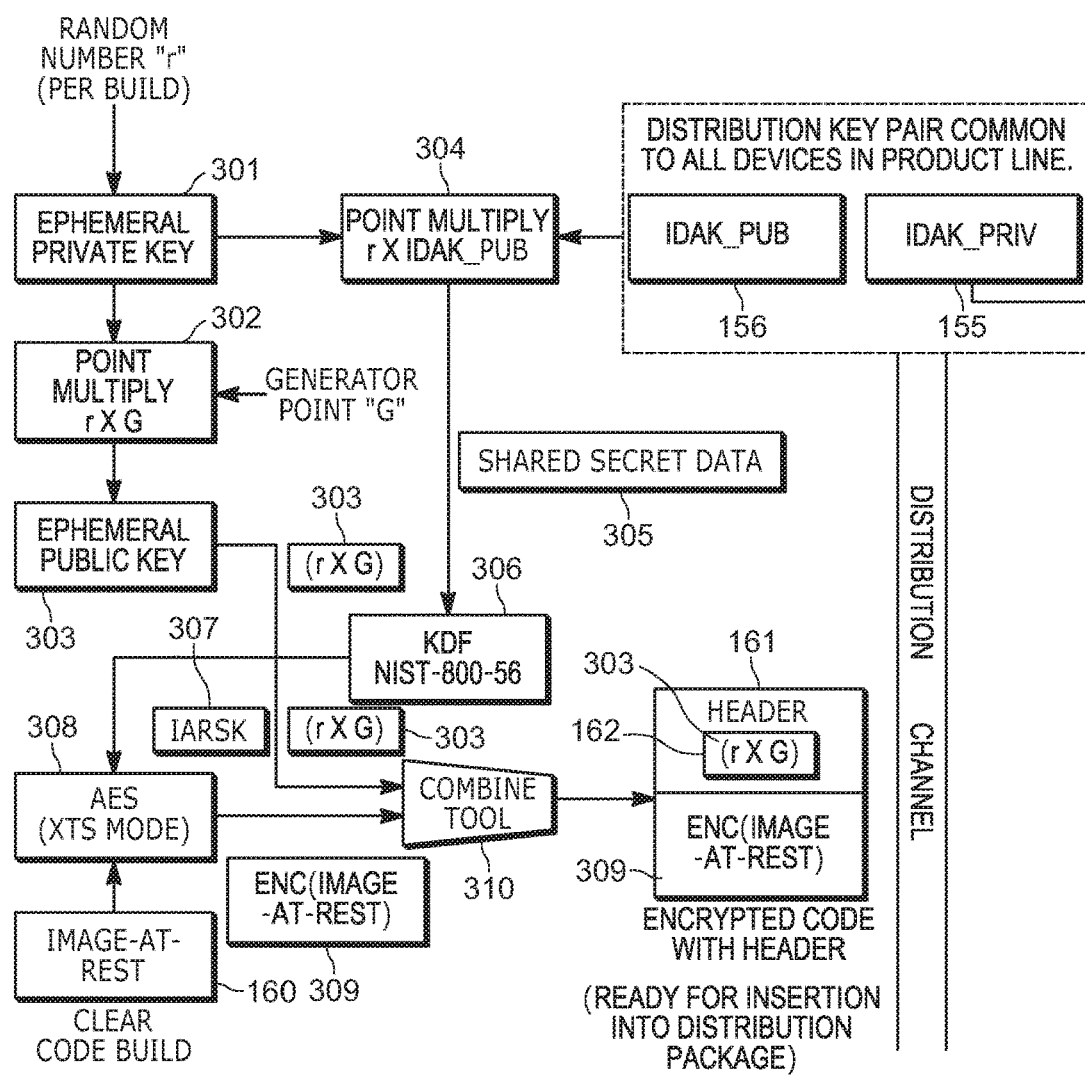
FIG. 3A and FIG. 3B depict a specific implementation of generating an encrypted data package using Elliptic Curve Integrated Encryption Scheme algorithms, in accordance with some examples.
Figure 3B:
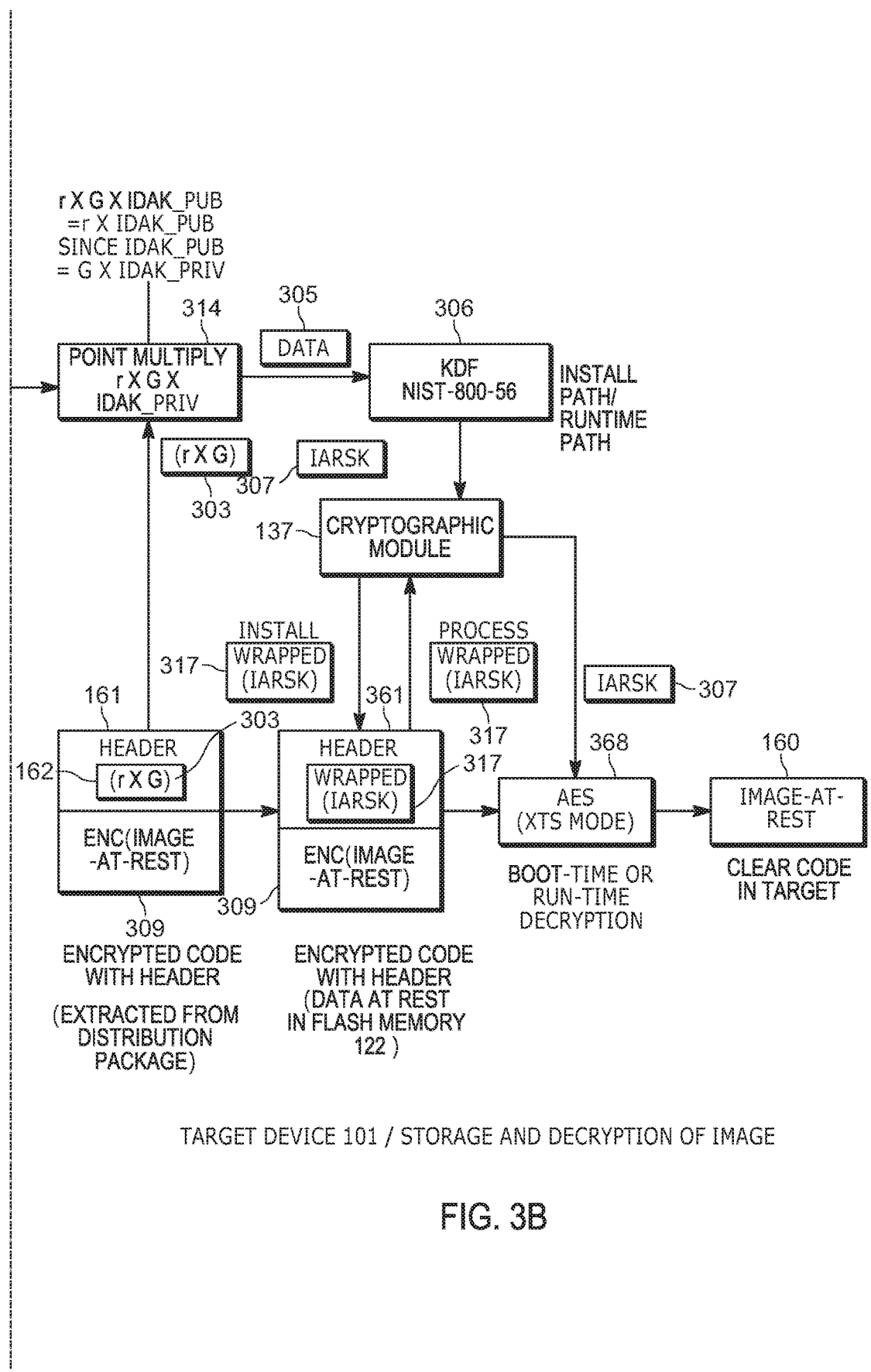

Attention is next directed to FIG. 3A and FIG. 3B which depict a specific example implementation of generating the encrypted data package 161 using ECIES algorithms and the public distribution key 156. In other words, in these examples the private distribution key 155 and the public distribution key 156 are complementary ECC keys.

In particular, FIG. 3A corresponds to a process which may be implemented at the data build system 105, for example by a processor thereof, and FIG. 3B corresponds to a process which may be implemented at the target device 101, for example at the secure processor 120 (e.g., at least partially by the cryptographic module 137). In FIG. 3A and FIG. 3B, the private distribution key 155 has been distributed to the device 101 via a distribution channel, for example as the encrypted private distribution key 157, and it is understood that the private distribution key 155 has been decrypted using the common protection key 154. Hence, in FIG. 3A and FIG. 3B, at least the block 202, the block 204, the block 206 and the block 208 of the method 200 have been implemented.

Furthermore, in FIG. 3A and FIG. 3B, the public distribution key 156 has been distributed to the data build system 103 via a distribution channel.

Furthermore, as noted in FIG. 3A and FIG. 3B, the private distribution key 155 and the public distribution key 156 are common to all the devices in a product line, including, but not limited to, the device 101; hence all the devices in a product line include a secure processor that is a same make and model as the secure processor 120.

Also depicted in FIG. 3A and FIG. 3B, at the data build device side, is the data package 160 which, as depicted, includes image-at-rest data ("Image-At-Rest").

As depicted, the data build system 105 generates an ephemeral (e.g., one-time) private key 301 using, for example, a random number generator; for example, as depicted the ephemeral private key 301 comprises a random number "r". The ephemeral private key 301 is point multiplied 302 with an elliptic curve generator point "G" to produce an ephemeral public key 303. In general, "G" comprises a fixed constant dictated by a standard defining a specific elliptic curve, which is provisioned at both the data build system 105 and the secure processor 120 (e.g., at the cryptographic module 137). As depicted, the ephemeral public key 303 comprises "r×G", or the random number "r" point multiplied with the generator point "G". Similarly, the public distribution key 156 is generally equal to the "G" times the private distribution key 155. It is understood that the same elliptic curve, and hence generator point "G", is used for both the ephemeral public key 303 and the public distribution key 156.

As depicted, the public distribution key 156 is also point multiplied 304 by the ephemeral private key 301 to generate shared secret data 305 (e.g., "r×IDAK_PUB") which is input into a key derivation function 306; for example, as depicted, the key derivation function 306 comprises a key derivation function defined by the National Institute of Standards and Technology standard "800-56". However, the key derivation function 306 may include any suitable key derivation function.

Using the shared secret data 305 as input, the key derivation function 306 generates a symmetric image-at-rest key 307 (e.g., labelled in FIG. 3A and FIG. 3B as "IARSK" or "Image-At-Rest Symmetric Key"). The image-at-rest key 307 and the data package 160 are input into an encryption function 308 which encrypts the image-at-rest data of the data package 160 using the image-at-rest key 307 to generate encrypted image-at-rest data 309.

As depicted, the encryption function 308 comprises an AES encryption function operating in an XTS (XEX (xor-encrypt-xor)-based tweaked-codebook mode with ciphertext stealing) mode, however the encryption function 308 may include any suitable encryption function.

The encrypted image-at-rest data 309 and the ephemeral public key 303 are combined by a combining tool 310 to generate the encrypted data package 161. While not depicted, a configuration file may also be input into the combining tool to define a format of the encrypted data package 161. In particular, the ephemeral public key 303 is included in a header portion of the encrypted data package 161 as the encryption data 162, and the encrypted image-at-rest data 309 is included (e.g., as distribution image data) in a body of the encrypted data package 161. In some examples, the encrypted data package 161 may be further incorporated into a distribution package which includes other types of data and/or other keys; a specific example implementation of such a distribution package is described below with respect to FIG. 4.

Furthermore, in general, the encryption data 162 of the block 210, of the method 200, comprises the ephemeral public key 303, as the ephemeral public key 303 generally enables the device 101 to obtain the image-at-rest key 307 therefrom, for example using the private distribution key 155 and complementary ECIES algorithms as described hereafter.

Hence, the encrypted data package 161 includes the image-at-rest data encrypted using the image-at-rest key 307 and the encryption data 162 (e.g., the ephemeral public key 303 and/or "r×G") for obtaining the image-at-rest key 307 using the private distribution key 155.

Furthermore, while the ephemeral public key 303 is provided in a header of the encrypted data package 161 and the encrypted data package 161 may be incorporated into a distribution package, the encrypted data package 161 may be in any suitable format.

Regardless of format, the encrypted data package 161 is provided to the production system 103, which provides the encrypted data package 161 to the device 101; for example, the encrypted data package 161 may be received at the device 101 at the block 210 of the method 200.

For example, as also depicted in FIG. 3A and FIG. 3B, the encrypted data package 161 has been provided to the device 101 (e.g., at the block 202 of the method 200).

The device 101, for example the processor 120, extracts the ephemeral public key 303 (e.g., and/or the encryption data 162) from the encrypted data package 161 and point multiplies 314 the ephemeral public key 303 (e.g., "r×G") by the private distribution key 155 to obtain the shared secret data 305.

For example, in general, the public distribution key 156 is generally equal to the "G" times the private distribution key 155 (or "IDAK_PUB=G×IDAK_PRIV"), hence, the ephemeral public key 303 multiplied by the private distribution key 155 also yields the shared secret data 305 (e.g., "r×G×IDAK_PRIV=r×IDAK_PUB").

The shared secret data 305 is input into the key derivation function 306 used to derive the image-at-rest key 307 at the data build system 105. In other words, both the device 101, and the data build system 105 include the key derivation function 306.

Hence, the key derivation function 306 at the device 101 determines the image-at-rest key 307 using the shared secret data 305. The device 101 may then decrypt the encrypted image-at-rest data 309 received in the encrypted data package 161.

As depicted, the image-at-rest key 307 is input to the cryptographic module 137 which wraps and/or encrypts the image-at-rest key 307 to generate a wrapped image-at-rest key 317 which is "installed" at the device 101 for example by replacing the ephemeral public key 303 with the wrapped image-at-rest key 317 at the encrypted data package 161 to generate an updated encrypted data package 361. The updated encrypted data package 361 may be stored at the flash memory 122.

When the image-at-rest data of the data package 160 is to be processed and/or executed and/or installed (e.g., in an unencrypted format) and/or be used by the device 101 (e.g., at a boot-time and/or a run-time), the processor 120 and/or the cryptographic module 137 retrieves the wrapped image-at-rest key 317 from the updated encrypted data package 361 (e.g., see "Process Wrapped IARSK" in FIG. 3A and FIG. 3B), and obtains the image-at-rest key 307 (e.g., by decrypting the wrapped image-at-rest key 317).

The image-at-rest key 307 and the encrypted image-at-rest data 309 are input into a decryption function 368 (e.g., complementary to the encryption function 308 and hence for decrypting data encrypted by the encryption function 308), which decrypts the encrypted image-at-rest data 309 to generate the data package 160 including the image-at-rest data.

The data package 160 and/or the image-at-rest data may be processed and/or executed and/or stored (e.g., in the memory 122). In some examples, the data package 160 may be deleted from the memory 122, for example when the device 101 is turned off, such that the data package 160 is not persistently stored in an unencrypted format.

While FIG. 3A and FIG. 3B is described with respect to the private distribution key 155 and the public distribution key 156 being complementary ECIES keys, in other examples, the private distribution key 155 and the public distribution key 156 may be generated (e.g. by the key generator device 107) using other types of complementary private/public key generation algorithms included, but not limited, to an RSA key generation algorithm.

Hence, in some examples, the private distribution key 155 and the public distribution key 156 may comprise complementary RSA keys generated by the key generator device 107; such an RSA key pair is generally protected and provisioned to the data build system 105 and the device 101 and as described above. In these examples, the shared secret data 305 may be generated by in the data build system 105 as a random number (e.g., using a random number generator) which is used to generate the image-at-rest key 307, which is used to generate the encrypted image-at-rest data 309. The shared secret data 305 (e.g., the random number) is encrypted using the public distribution key 156, and the encrypted shared secret data is then input to the combining tool 310 to be included in the header of the encrypted data package 161 (which includes the encrypted image-at-rest data 309). When the encrypted data package 161 is received at the device 101, the encrypted shared secret data is decrypted using the private distribution key 155 to obtain the shared secret data 305 (e.g. the random number) which is used to again generate the image-at-rest key 307 to decrypt the encrypted image-at-rest data 309, as described above.

Figure 4:
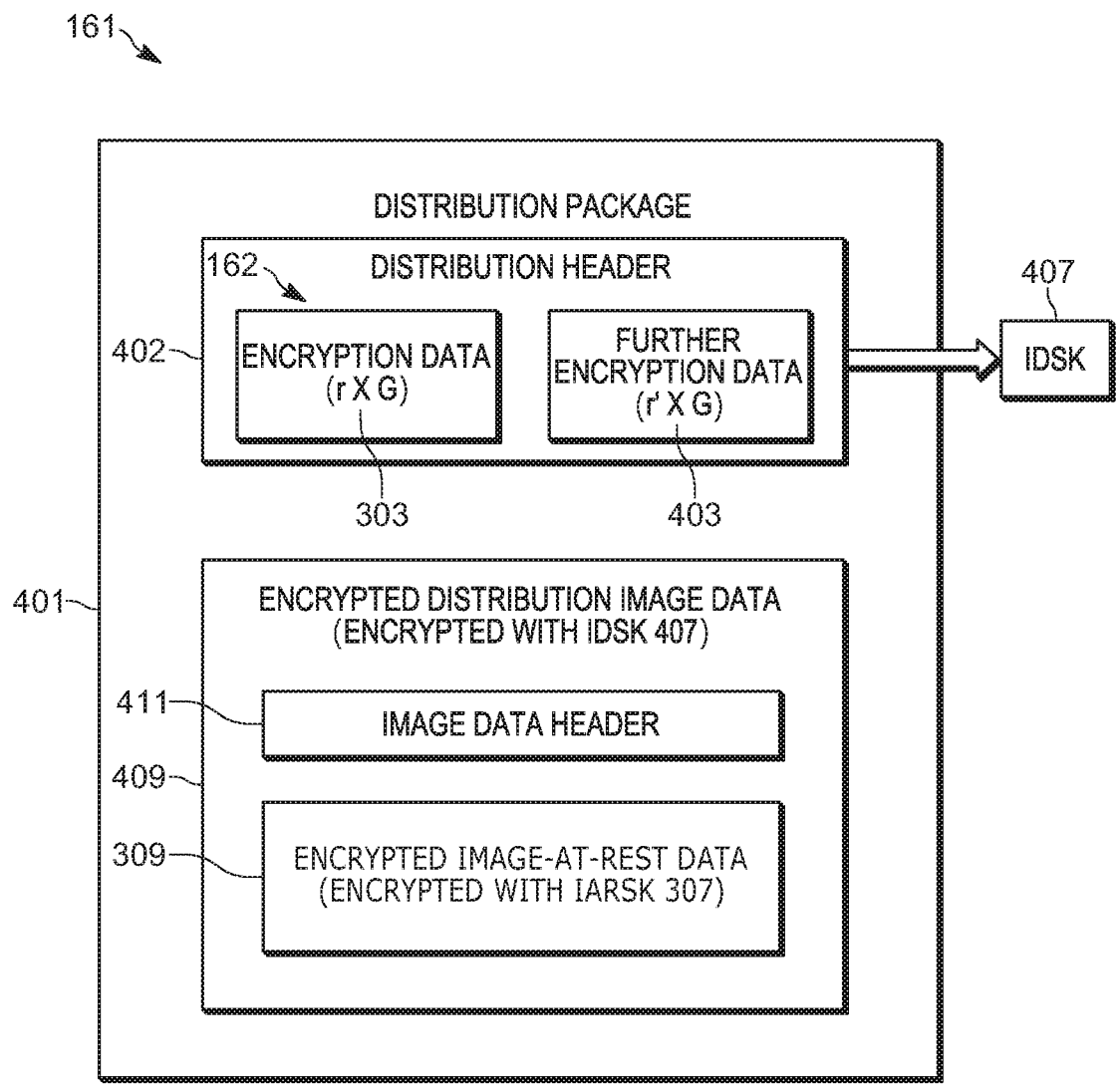
FIG. 4 depicts a specific format of an encrypted data package, in accordance with some examples.

Attention is next directed to FIG. 4 which depicts a specific example format of the encrypted data package 161 as incorporated into a distribution package 401 that includes the encryption data 162 (e.g., the ephemeral public key 303) for obtaining the image-at-rest key 307, for example as incorporated into a header 402 (e.g., a distribution header) of the distribution package 401.

As depicted, the header 402 includes further encryption data 403 for obtaining an image-distribution key 407 using the private distribution key 155. For example, as depicted, the encrypted image-at-rest data 309 is itself incorporated into encrypted distribution image data 409, which is encrypted with the image-distribution key 407 (e.g., "IDSK" or image-distribution symmetric key) obtainable from the further encryption data 403. As depicted, the encrypted distribution image data 409 includes a header 411 (e.g., an image data header) which is also encrypted with the image-distribution key 407; the header 411 may include metadata, and the like, associated with the distribution image data 409, the image-at-rest data 160, and the like (e.g., a type of data and/or a version number of data and/or a length of data, and the like, of the encrypted image-at-rest data 309 and/or the image-at-rest data 160).

Hence, as depicted, the encrypted distribution image data 409 (e.g., including the header 411 and the encrypted image-at-rest data 309) is encrypted using the image-distribution key 407 (and may be decrypted using the image-distribution key 407); and the encrypted image-at-rest data 309 is encrypted using the image-at-rest key 307 (and may be decrypted using the image-at-rest key 307 after the encrypted distribution image data 409 is decrypted using the image-distribution key 407).

However, the header 411 and/or encryption of the distribution image data to obtain the encrypted distribution image data 409 may be optional; in these examples, the further encryption data 403 and the image-distribution key 407 may also be optional.

In particular, the image-distribution key 407 is generated in a similar manner to the image-at-rest key 307, but using a different random number "r'". Hence, the further encryption data 403 comprises the different random number multiplied by the generator point (e.g., "r'×G") and the different random number r' is multiplied by the public distribution key 156 (e.g., at the data build system 105) to generate respective shared secret data which is used to generate the image-distribution key 407, which is used to again encrypt the encrypted image-at-rest data 309, and the header 411, as the encrypted distribution image data 409. Hence, in these examples, the image-at-rest data 309 is encrypted twice, and the data in the header 402 may be used by the device 101 to obtain keys to decrypt both the encrypted distribution image data 409, and the header 411, and the encrypted image-at-rest data 309.

Put another way, in these examples, the encrypted data package 161 comprises: the header 402 comprising the encryption data 162 (e.g., the ephemeral public key 303) and the further encryption data 403 for obtaining an image-distribution key 407 using the private distribution key 155; and distribution image data 409 encrypted using the image-distribution key 407, the distribution image data 409 comprising the image-at-rest data encrypted using the image-at-rest key 307. Furthermore, in these examples, the processor 120 may be configured to obtain the image-at-rest data by: obtaining the image-distribution key 407 using the further encryption data 403 and the private distribution key 155; decrypting the distribution image data 409 using the image-distribution key 407 to obtain the image-at-rest data as encrypted by the image-at-rest key 307; obtaining the image-at-rest key 307 using the encryption data (e.g., the ephemeral public key 303) and the private distribution key 155; and decrypting the image-at-rest data using the image-at-rest key 307. In other words, the process for obtaining the image-distribution key 407 and decrypting the distribution image data 409 is the same as the process for obtaining the image-at-rest key 307 and decrypting the image-at-rest data, but implemented using the further encryption data 403.

It is further understood that, in some examples, that portions of the image-at-rest data may also be encrypted and that yet further encryption data may be incorporated into the header 402 to obtain keys for decrypting the portions of the image-at-rest data. Hence, in present examples, encrypted data may be nested inside other encrypted data in any suitable number of encryption levels, with corresponding encryption data for obtaining decryption keys incorporated into the header 402.

It is further understood that when the private distribution key 155 and the public distribution key 156 comprise an RSA key pair, and the like, the encryption data (e.g., the encrypted shared secret data 305 replaces the ephemeral public key 303 as described above) and the further encryption data 403 of the header 402 are adapted accordingly.

Figure 5A:
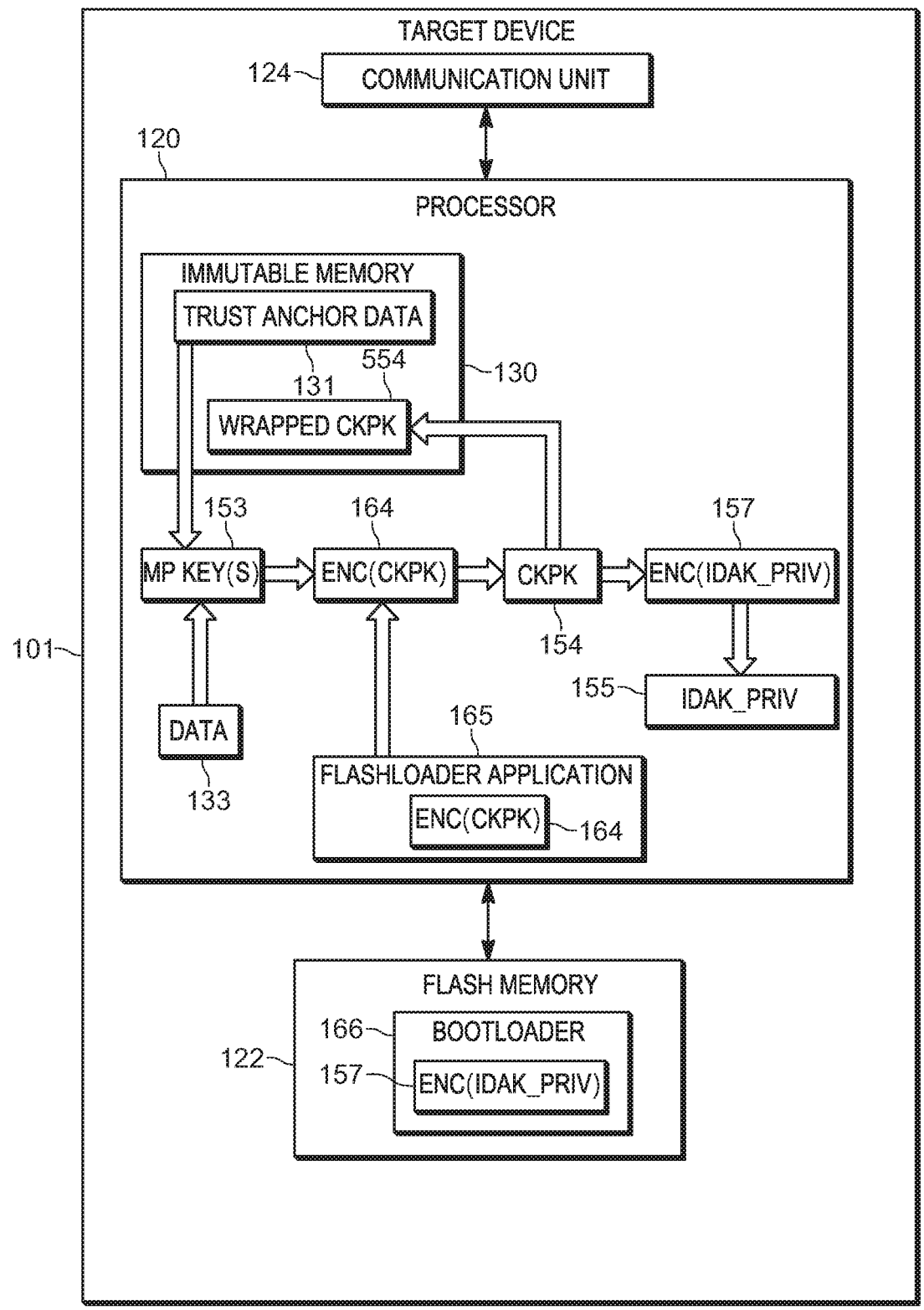
FIG. 5A depicts a device installing a wrapped common protection key and deriving a private distribution key, in accordance with some examples.

Attention is next directed to FIG. 5A which depicts the device implementing the block 204, the block 206 and the block 208 of the method 200. While not all components of the processor 120 are depicted in FIG. 5A (e.g., the RAM 135, the ROM 136, and the modules 132, 137) they are nonetheless understood to be present. In particular, in FIG. 5A, the device 101 has received the flashloader application 165, with the encrypted common protection key 164, and the bootloader application 166, with the encrypted private distribution key 157. The flashloader application 165, with the encrypted common protection key 164 may be stored at the RAM 135 and, as depicted, the bootloader application 166 may be stored at the flash memory 122. As depicted, the processor 120 derives and/or generates the at least one manufacturing protection key 153 from a combination of the trust anchor data 131, as stored at the immutable memory portion 130, and the non-exportable data 133, as stored at the module 132 (not depicted). The at least one manufacturing protection key 153 is used to decrypt the encrypted common protection key 164 (e.g., received with the flashloader application 165) to obtain the common protection key 154. The common protection key 154 may be and/or encrypted (e.g. using a key and/or data unique to the device 101 and/or the processor 120, including, but not limited to, a unique processor identifier, and the like) and stored at the immutable memory portion 130 as a wrapped common protection key 554. While not depicted, the common protection key 154 may be decrypted (e.g. from the encrypted common protection key 164, and/or from the wrapped common protection key 554), within the cryptographic module 137 and generally does not exist outside the cryptographic module 137. The common protection key 154 may be used to decrypt the encrypted private distribution key 157 to generate the private distribution key 155. The private distribution key 155 may be used to install the encrypted data package 161, as described with respect to FIG. 3A and FIG. 3B. While not depicted, the MP key 153, the common protection key 154 and the private distribution key 155 may be deleted after use. Regardless, the MP key 153, the common protection key 154 and the private distribution key 155, as unencrypted, may remain within the cryptographic module 137 and/or a secure portion of the processor 120, and generally do not exist outside the cryptographic module 137 and/or a secure portion of the processor 120.

Figure 5B:
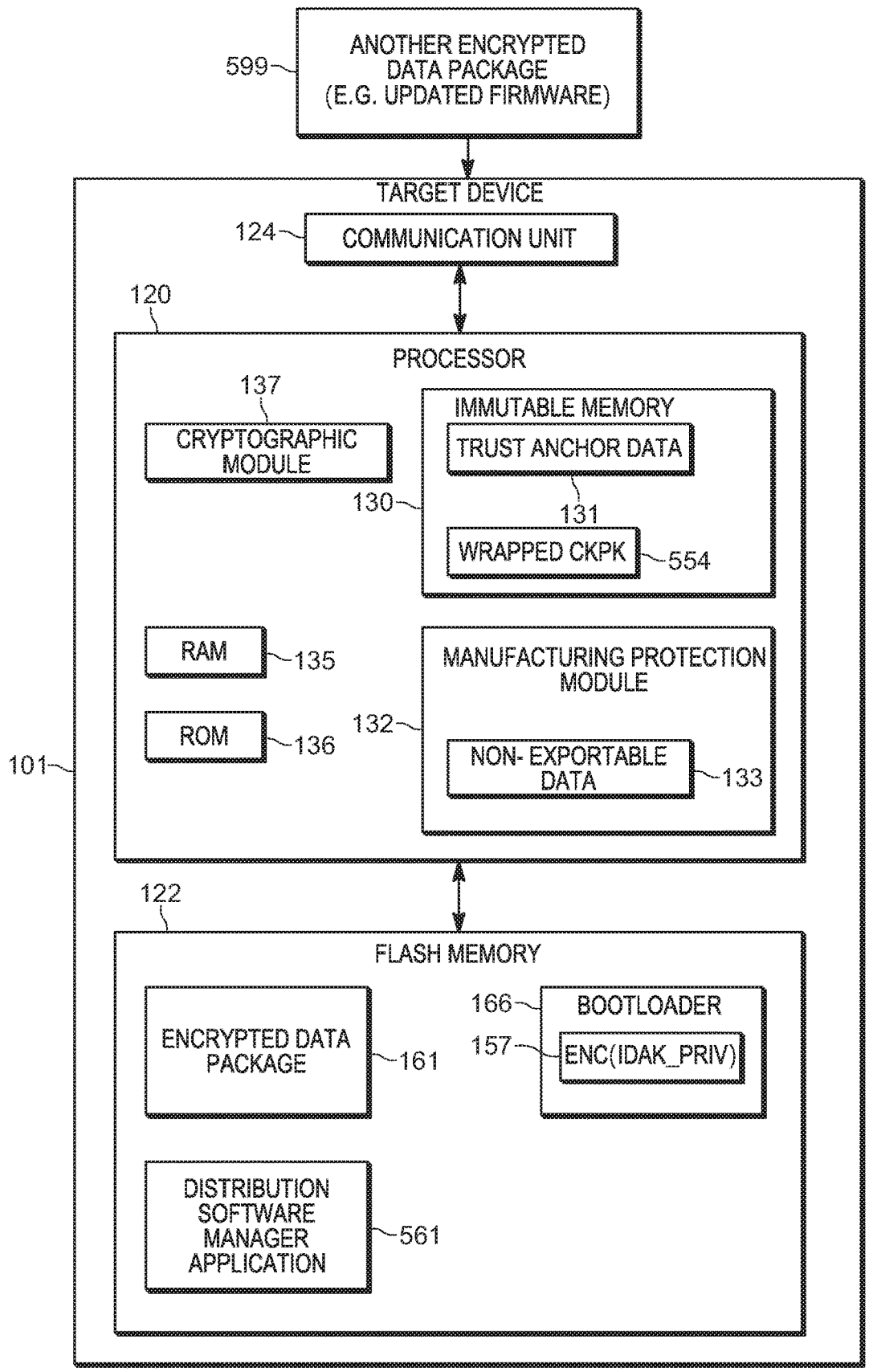
FIG. 5B depicts the device of FIG. 5A with an installed encrypted data package, in accordance with some examples.

Attention is next directed to FIG. 5B which depicts the device 101 after an implementation of the method 200, including implementation of the block 204, the block 206 and the block 208 of the method 200 as depicted in FIG. 5A, and after installation of the encrypted data package 161 at the block 212 of the method 200. In particular, as depicted in FIG. 5B, the device 101 stores the wrapped common protection key 554 in the immutable memory portion 130, and further stores the encrypted data package 161 at the flash memory 122. None of the keys are stored in an unencrypted format, and neither is the encrypted data package 161. In particular, the wrapped common protection key 554 comprises the common protection key 154 stored in a wrapped and/or encrypted format, as described above. The encrypted data package 161 is stored at the flash memory 122, as is the bootloader application 166. Hence, as depicted, the bootloader application 166 may persist at the device 101 after the production system 103 provisions the device 101. However, the flashloader application 165 is generally used on a one-time basis when the production system 103 provisions the device 101.

Furthermore, as depicted, the memory 122 stores a distribution software manager application 561, which may be used to at least partially implement the blocks 208, 210, 212 of the method 200 when the device 101 is the field and software updates are received. For example, the distribution software manager application 561 may include similar functionality as the flashloader application 165, with the flashloader application 165 being used to at least partially implement the method 200 when the device 101 is being provisioned by the production system 103, and with the distribution software manager application 561 being used to at least partially implement the method 200 when software updates are received at the device 101 (e.g., wirelessly). In these examples, the software updates may be encrypted in a manner similar to the encrypted data package 161, and installed at the device 101 in a similar manner.

Hence, in the depicted examples, the flashloader application 165 may include and/or install the distribution software manager application 561.

Indeed, in some examples, when the device 101 is being provisioned by the production system 103, after the blocks 202, 204 and 206 are implemented, the flashloader application 165 may cause the device 101 to reboot and implement the remainder of the method 200 (e.g., the blocks 208, 210, 212) by executing the distribution software manager application 561.

Regardless, once the device 101 is in the field, and the like, and another encrypted data package 599 is to be received (e.g., via the communication unit 124, from a distribution software system) and installed, the processor 120 may execute the distribution software manager application 561 to implement the blocks 208, 210, 212 of the method 200.

Figure 6:
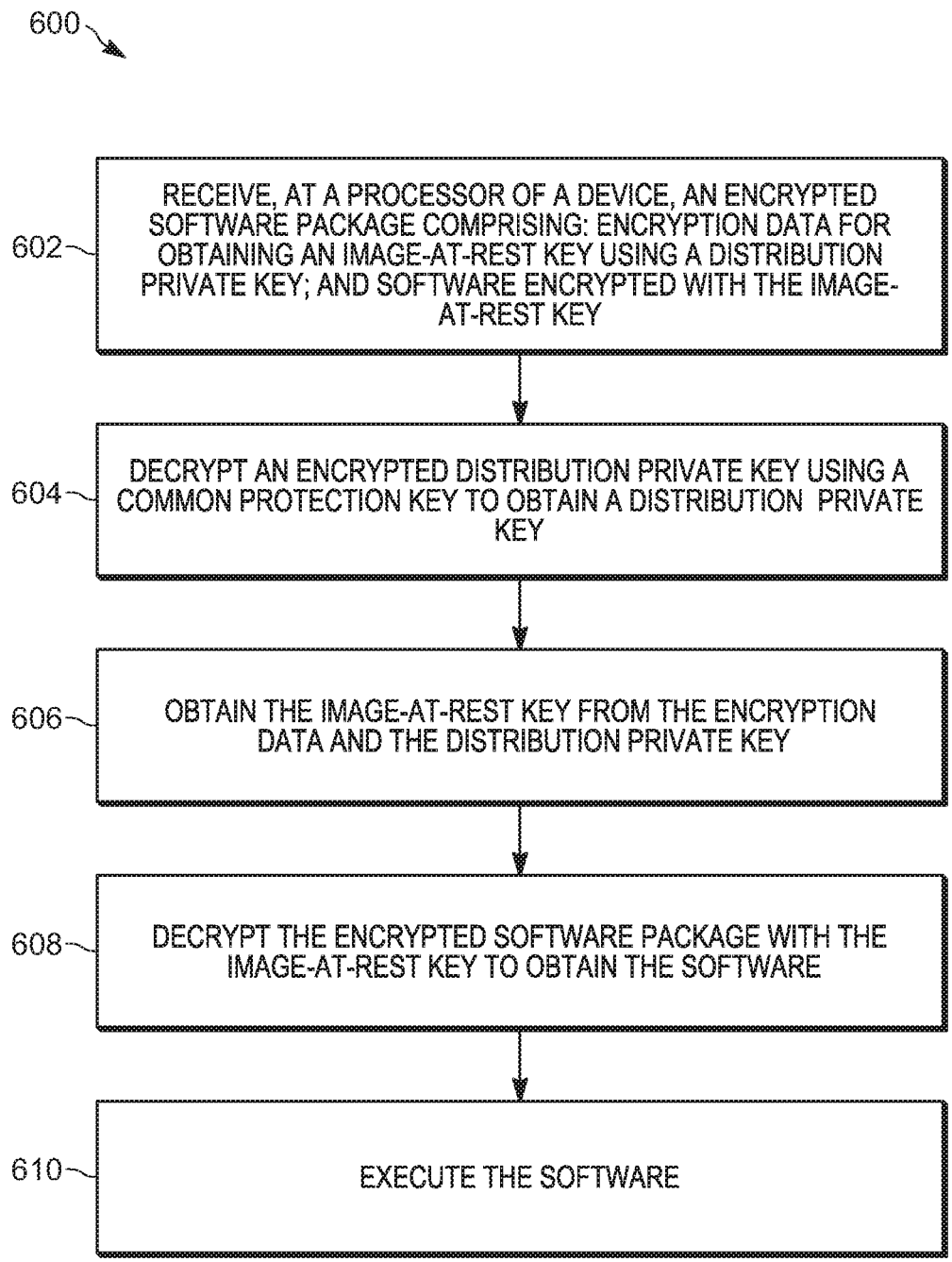
FIG. 6 depict a flowchart of another method for installing encrypted data, in accordance with some examples.

Attention is now directed to FIG. 6 which depicts a flowchart representative of a method 600 for installing encrypted data. The method 600 comprises an implementation of the blocks 208, 210, 212 of the method 200 in which encrypted software is received and installed at the device 101. The operations of the method 600 of FIG. 6 may correspond to machine readable instructions that are executed by the device 101, and specifically the processor 120 of the device 101. In the illustrated example, the instructions represented by the blocks of FIG. 6 may be at may be at least partially implemented by the cryptographic module 137 and/or the distribution software manager application 561. The method 600 of FIG. 6 is one way in which the processor 120 and/or the device 101 and/or the system 100 may be configured. Furthermore, the following discussion of the method 600 of FIG. 6 will lead to a further understanding of the system 100, and its various components.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 100 of FIG. 1A, FIG. 1B and FIG. 1C, as well. The method 600 will be further described with reference to the components of the device 101 as depicted in FIG. 6, as well as the process of FIG. 3A and FIG. 3B.

At a block 602, the processor 120 and/or the device 101 receives an encrypted software package (e.g., the encrypted data package 161, or the another encrypted data package 599) comprising: encryption data (e.g., the ephemeral public key 303) for obtaining an image-at-rest key (e.g., the image-at-rest key 307) using the private distribution key 155; and software (e.g., the image-at-rest data) encrypted with the image-at-rest key 307. The software may comprise firmware and/or updated firmware for the device 101.

At a block 604, the processor 120 and/or the device 101 decrypts the encrypted private distribution key 157 using the common protection key 154 to obtain a private distribution key (e.g., the private distribution key 155). The common protection key 154 is generally stored as the wrapped common protection key 554 and hence, at the block 604, the wrapped common protection key 554 is obtained from the immutable memory portion 130 and unwrapped to obtain the common protection key 154 which is used to decrypt the encrypted private distribution key 157.

At a block 606, the processor 120 and/or the device 101 obtains the image-at-rest key 307 from the encryption data and the private distribution key 155 as described above with respect to FIG. 3A and FIG. 3B.

At a block 608, the processor 120 and/or the device 101 decrypts the encrypted software package with the image-at-rest key 307 to obtain the software, as also described above with respect to FIG. 3A and FIG. 3B.

At a block 610, the processor 120 and/or the device 101 executes the software, for example to execute firmware of the device 101 and/or update the firmware of the device 101.

Provided herein are devices, systems and methods for installing encrypted data, for example at a portable device. Indeed, it is understood that the manufacturing protection key 153 as described above, having the trust anchor data 131 as a component protects against malicious entities attempting to later install malicious applications and/or software and/or code at the device 101. For example, the trust anchor data 131 may comprise a hash of a public key complementary to a private key used to sign applications and/or software and/or code run that is to run on the device 101. Further, the device 101 is generally closed such that the processor 120 cannot run unsigned applications and/or software and/or code. As the malicious entities generally do not have the ability to sign applications and/or software and/or code in a way that validates against that trust anchor data 131, such malicious entities won't be able to generate applications and/or software and/or code that uses the manufacturing protection key 153, for example as the malicious entities will not have access to the private key complementary to the public key (and/or hash thereof) of the trust anchor data 131. Furthermore, as the production system 103 does not have access to unencrypted keys (and/or the data 133), the production system 103 cannot access the data package 160, nor any keys of the device 101. Similarly, as the data build system 105 does not have access to the manufacturing protection key 153, or the data 133, the data build system 105 cannot control generate, nor control, cryptographic keys for the device 101.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . ." and "one or more . . ." language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   a communication unit;
   a memory;
   a processor including: an immutable memory portion storing preconfigured trust anchor data; and a module storing preconfigured non-exportable data for obtaining a manufacturing protection key using the preconfigured trust anchor data;
   the processor configured to:
      receive, via the communication unit: an encrypted common protection key, encrypted using the manufacturing protection key; and an encrypted distribution private key, encrypted using a common protection key corresponding to the encrypted common protection key;
      obtain the manufacturing protection key using the preconfigured trust anchor data and the preconfigured non-exportable data;
      decrypt the encrypted common protection key using the manufacturing protection key to obtain the common protection key;
      decrypt the encrypted distribution private key using the common protection key to obtain a distribution private key;
      receive, via the communication unit, an encrypted data package including image-at-rest data encrypted with an image-at-rest key, the encrypted data package including encryption data for obtaining the image-at-rest key using the distribution private key; and
      install the encrypted data package at the memory.

2. The device of claim 1, wherein the encryption data is derived using at least a distribution public key complementary to the distribution private key.

3. The device of claim 1, wherein the processor is further configured to:
   obtain the image-at-rest key using the encryption data and the distribution private key; and
   store, at the memory, the image-at-rest key as a wrapped image-at-rest key.

4. The device of claim 3, wherein the processor is further configured to install the encrypted data package at the memory by:
   decrypting the image-at-rest data using the image-at-rest key obtained from the wrapped image-at-rest key; and
   installing the image-at-rest data at the memory.

5. The device of claim 3, wherein the processor is further configured to, at one or more of a boot-time and a run-time:
   decrypt the image-at-rest data using the image-at-rest key obtained from the wrapped image-at-rest key; and
   process the image-at-rest data.

6. The device of claim 1, wherein the encrypted data package comprises:
   a header comprising the encryption data and further encryption data for obtaining an image-distribution key using the distribution private key; and
   distribution image data encrypted using the image-distribution key, the distribution image data comprising image-at-rest data encrypted using the image-at-rest key.

7. The device of claim 6, wherein the processor is further configured to obtain the image-at-rest data by:
   obtaining the image-distribution key using the further encryption data and the distribution private key;
   decrypting the distribution image data using the image-distribution key to obtain the image-at-rest data as encrypted by the image-at-rest key;
   obtaining the image-at-rest key using the encryption data and the distribution private key; and
   decrypting the image-at-rest data using the image-at-rest key.

8. The device of claim 1, wherein the processor is further configured to:
   store the common protection key at the immutable memory portion as a wrapped common protection key; and
   decrypt the encrypted distribution private key using the common protection key obtained from the wrapped common protection key.

9. The device of claim 1, wherein the common protection key is stored as a wrapped common protection key at the immutable memory portion, and the preconfigured trust anchor data and the wrapped common protection key are stored in the immutable memory portion as fused bits.

10. The device of claim 1, wherein the encrypted common protection key is received, via the communication unit, in a flashloader application which, when processed by the processor, causes the processor to at least:
    obtain the manufacturing protection key and the common protection key; and
    store the common protection key as a wrapped common protection key in the immutable memory portion.

11. A method comprising:
    receiving, at a processor of a device: an encrypted common protection key, encrypted using a manufacturing protection key; and an encrypted distribution private key, encrypted using a common protection key corresponding to the encrypted common protection key;

obtaining, at the processor, the manufacturing protection key using preconfigured trust anchor data, stored at an immutable memory portion of the processor, and preconfigured non-exportable data, stored at a module of the processor;

decrypting, at the processor, the encrypted common protection key using the manufacturing protection key to obtain the common protection key;

decrypting, at the processor, the encrypted distribution private key using the common protection key to obtain a distribution private key;

receiving, at the processor, an encrypted data package including image-at-rest data encrypted with an image-at-rest key, the encrypted data package including encryption data for obtaining the image-at-rest key using the distribution private key; and installing, using the processor, the encrypted data package at a memory of the device.

12. The method of claim 11, wherein the encryption data is derived using at least a distribution public key complementary to the distribution private key.

13. The method of claim 11, further comprising:
obtaining the image-at-rest key using the encryption data and the distribution private key; and
storing, at the memory, the image-at-rest key as a wrapped image-at-rest key.

14. The method of claim 13, wherein the installing the encrypted data package at the memory comprises:
decrypting the image-at-rest data using the image-at-rest key obtained from the wrapped image-at-rest key; and
installing the image-at-rest data at the memory.

15. The method of claim 13, further comprising, at one or more of a boot-time and a run-time:
decrypting the image-at-rest data using the image-at-rest key obtained from the wrapped image-at-rest key; and
processing the image-at-rest data.

16. The method of claim 11, wherein the encrypted data package comprises:
a header comprising the encryption data and further encryption data for obtaining an image-distribution key using the distribution private key; and
distribution image data encrypted using the image-distribution key, the distribution image data comprising image-at-rest data encrypted using the image-at-rest key.

17. The method of claim 16, further comprising obtaining the image-at-rest data by:
obtaining the image-distribution key using the further encryption data and the distribution private key;
decrypting the distribution image data using the image-distribution key to obtain the image-at-rest data as encrypted by the image-at-rest key;
obtaining the image-at-rest key using the encryption data and the distribution private key; and
decrypting the image-at-rest data using the image-at-rest key.

18. The method of claim 11, further comprising:
store the common protection key at the immutable memory portion as a wrapped common protection key; and
decrypt the encrypted distribution private key using the common protection key obtained from the wrapped common protection key.

19. The method of claim 11, wherein the common protection key is stored as a wrapped common protection key at the immutable memory portion, and the preconfigured trust anchor data and the wrapped common protection key are stored in the immutable memory portion as fused bits.

* * * * *